United States Patent
Bjørkgård

(12) 
(10) Patent No.: US 6,443,287 B2
(45) Date of Patent: Sep. 3, 2002

(54) CLUTCH

(75) Inventor: Sven Bjørkgård, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 0 days.

(21) Appl. No.: 09/845,340

(22) Filed: May 1, 2001

Related U.S. Application Data

(63) Continuation of application No. PCT/NO99/00329, filed on Oct. 29, 1999.

(30) Foreign Application Priority Data

Nov. 2, 1998 (NO) .............................. 19985107

(51) Int. Cl.[7] ...................... F16D 27/04; F16D 25/0635
(52) U.S. Cl. ...................... 192/90; 192/84.95; 192/91 R
(58) Field of Search ........................... 192/90, 91 R, 192/101, 112, 84.95; 74/606 R

(56) References Cited

U.S. PATENT DOCUMENTS

| | | | |
|---|---|---|---|
| 3,180,469 A | | 4/1965 | Wiedmann et al. ............ 192/90 |
| 3,224,540 A | | 12/1965 | Straub .......................... 192/90 |
| 3,833,102 A | * | 9/1974 | Stahle .......................... 192/90 |
| 3,999,634 A | | 12/1976 | Howell ....................... 188/71.6 |
| 4,082,156 A | * | 4/1978 | Krolak et al. ............... 180/9.62 |
| 4,134,478 A | | 1/1979 | Balzer ......................... 188/106 |
| 4,428,471 A | * | 1/1984 | Parker et al. .............. 192/91 R |
| 4,645,039 A | * | 2/1987 | Lewis et al. .............. 192/91 R |
| 4,646,894 A | | 3/1987 | Kamio .................... 192/85 AA |
| 5,205,387 A | | 4/1993 | Checa .................... 192/85 CA |
| 5,261,517 A | * | 11/1993 | Hering ....................... 192/91 A |
| 5,538,121 A | * | 7/1996 | Hering ...................... 192/70.12 |
| 5,810,142 A | * | 9/1998 | Schaefer .................. 192/91 R |

FOREIGN PATENT DOCUMENTS

| | | |
|---|---|---|
| DE | 3425346 | 1/1986 |
| GB | 2147668 | 5/1985 |
| GB | 2310021 | 8/1997 |
| JP | 55-40315 | 3/1980 |
| JP | 5-164143 | * 6/1993 |

OTHER PUBLICATIONS

Abstract of 61–130627, Jun. 18, 1986, Japan.
Abstract of WI 91/00440 Jan. 10, 1991 WIPO.

* cited by examiner

*Primary Examiner*—Rodney H Bonck
(74) *Attorney, Agent, or Firm*—Finnegan, Henderson, Farabow, Garrett & Dunner, L.L.P.

(57) ABSTRACT

A clutch for connecting a flywheel (1) on a drive shaft (2) of an engine with a driven shaft (15) of a gearbox. The flywheel (1) is connected to a clutch cover (7) and between them there is disposed an axially movable pressure plate (8). A clutch disc (9), which is non-rotationally connected to the driven shaft (15), can be clamped between the pressure plate (8) and the flywheel (2) by means of a spring (21) which forces the pressure plate (8) against the flywheel (2). By operating an actuator device (44), the spring's (21) connection with the pressure plate (8) can be broken. According to the invention the clutch comprises a swivel being arranged between the actuator and the driven shaft. The swivel is for transferring a pressure fluid or an electric current to the actuator which may be a hydraulic or an electric actuator.

5 Claims, 2 Drawing Sheets

CLUTCH

Figure 1:
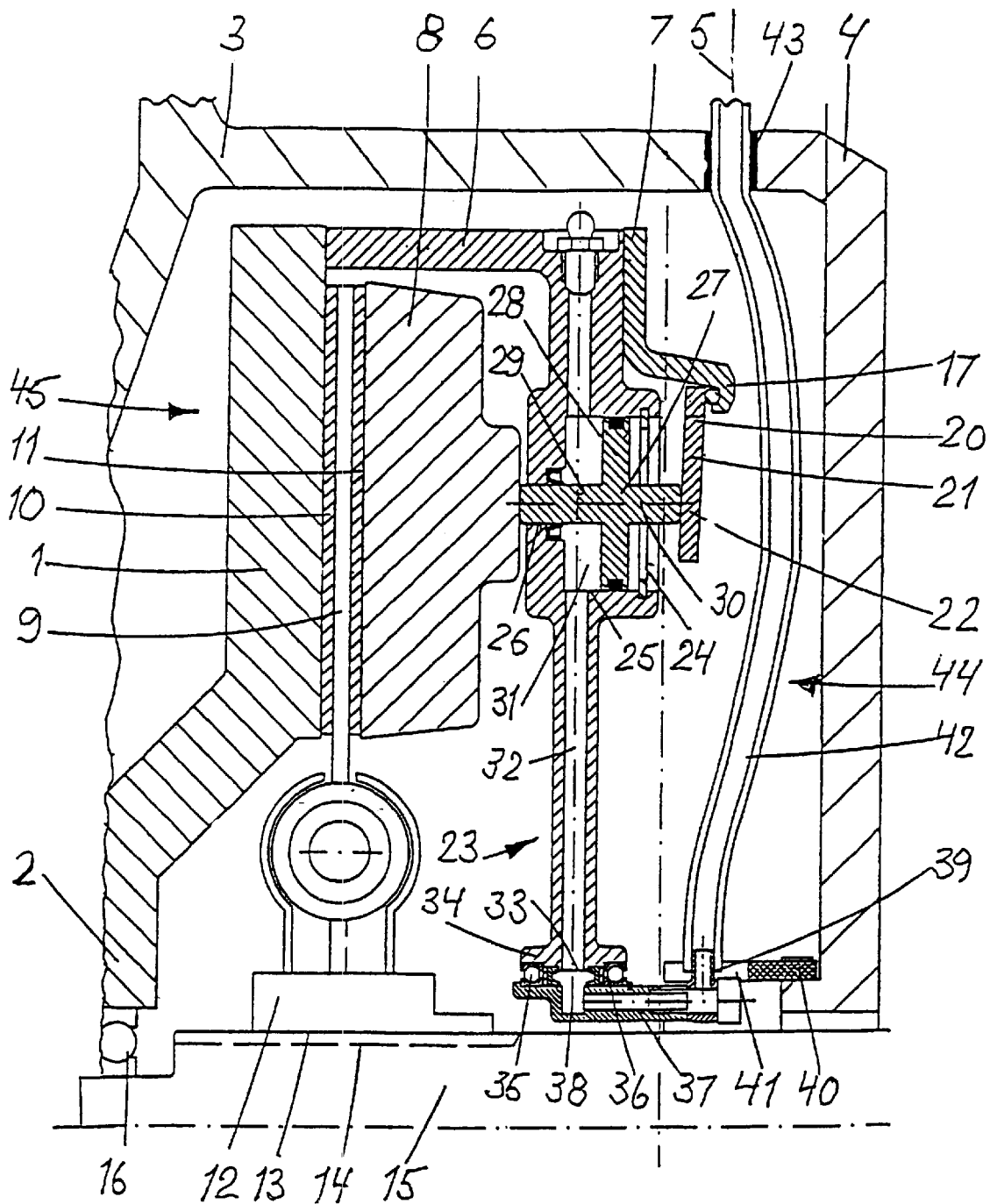

This application is a continuation of international application number PCT/NO99/00329, filed Oct. 29, 1999, the content of which is incorporated herein by reference.

The invention relates to a clutch for use in a transmission line of a vehicle, comprising a first and a second main part which extend coaxially in relation to each other and are rotatable about a common longitudinal axis, and which are non-rotationally connected to a drive shaft and a driven shaft respectively, wherein the first main part has a first and a second portion which are arranged at a distance apart in the axial direction, and a pressure plate and at least one pressure spring which are mounted between the first and the second portion, and the second main part has a clutch disc, the pressure plate and the clutch disc being axially movably connected to the drive shaft and the driven shaft respectively, and the pressure spring is mounted between the second portion and the pressure plate, attempting to bring the latter into frictional engagement against the clutch disc and simultaneously the clutch disc into frictional engagement against the first portion, and the clutch further comprises an actuator device which is arranged for engagement with the pressure spring, hereby reducing the spring force exerted by the pressure spring against the pressure plate in order to reduce the frictional engagements, where the actuator device is comprised in the first main part and has an axially movable body which is arranged between the pressure spring and the pressure plate, and via which the spring force is transferred to the pressure plate when the actuator device is not in operation.

From the prior art clutches are known in which the spring is a diaphragm spring or membrane spring which extends from the second portion to near the driven shaft. The actuator may be a hydraulic cylinder device which is provided inside a clutch housing, having a cylinder and a cylindrical piston disposed therein, through which the driven shaft can extend axially. On the piston there may be mounted a release bearing through which the driven shaft similarly extends, and via which the piston is connected to the radially inner portion of the diaphragm spring.

Alternatively, the actuator may be disposed outside the clutch housing and be connected to a release bearing via a mechanism.

Even though the drive shaft and the driven shaft nominally should extend coaxially, in practice this is only achieved within certain production tolerances. When the engine is running, therefore, a relative movement is obtained of the rotating components of the clutch's main parts, which is undesirable as it can lead to vibration of the clutch, and this vibration can be transmitted to the vehicle in which the clutch is mounted. It may moreover result in excess wear on the clutch's components.

Since the portion of the diaphragm spring which influences the pressure plate is normally located at the periphery of the pressure plate, and a radially inner portion of the diaphragm spring is influenced by the actuator, together with the fact that the intermediate portion of the diaphragm spring is elastically flexible, especially if this intermediate portion comprises radially extending fingers, the piston has to travel a great distance in order to release the clutch. The clutch's axial length will thereby also be great and the clutch will be heavy and voluminous.

An object of the invention is to provide a clutch which is not encumbered with the above-mentioned disadvantages.

In DE-A-34 25 346 it is disclosed a friction clutch having a first main part, a second main part, a pressure plate being constituted by a first friction plate, a pressure spring, clutch discs on the second main part and an actuator device engaging the pressure spring to reduce the spring force exerted by the spring. The actuator device is comprised in the first main part and has an axially movable body which is arranged between the pressure spring and the pressure plate and via which the spring force is transferred to the pressure plate when the actiator device is not in operation. This clutch comprises an opening in a stationary outer housing, which may be connected to a fluid supply.

The clutch according to the invention differs from this known device in that it comprises a swivel being arranged between the actuator and the driven shaft. By this arrangement the outer diameter of the clutch can be kept to a minimum. The swivel is for transferring a pressure fluid or an electric current to the actuator which may be a hydraulic or electric actuator.

The characteristics of the clutch according to the invention are set forth in the characterising features indicated in the claims.

Figure 2:
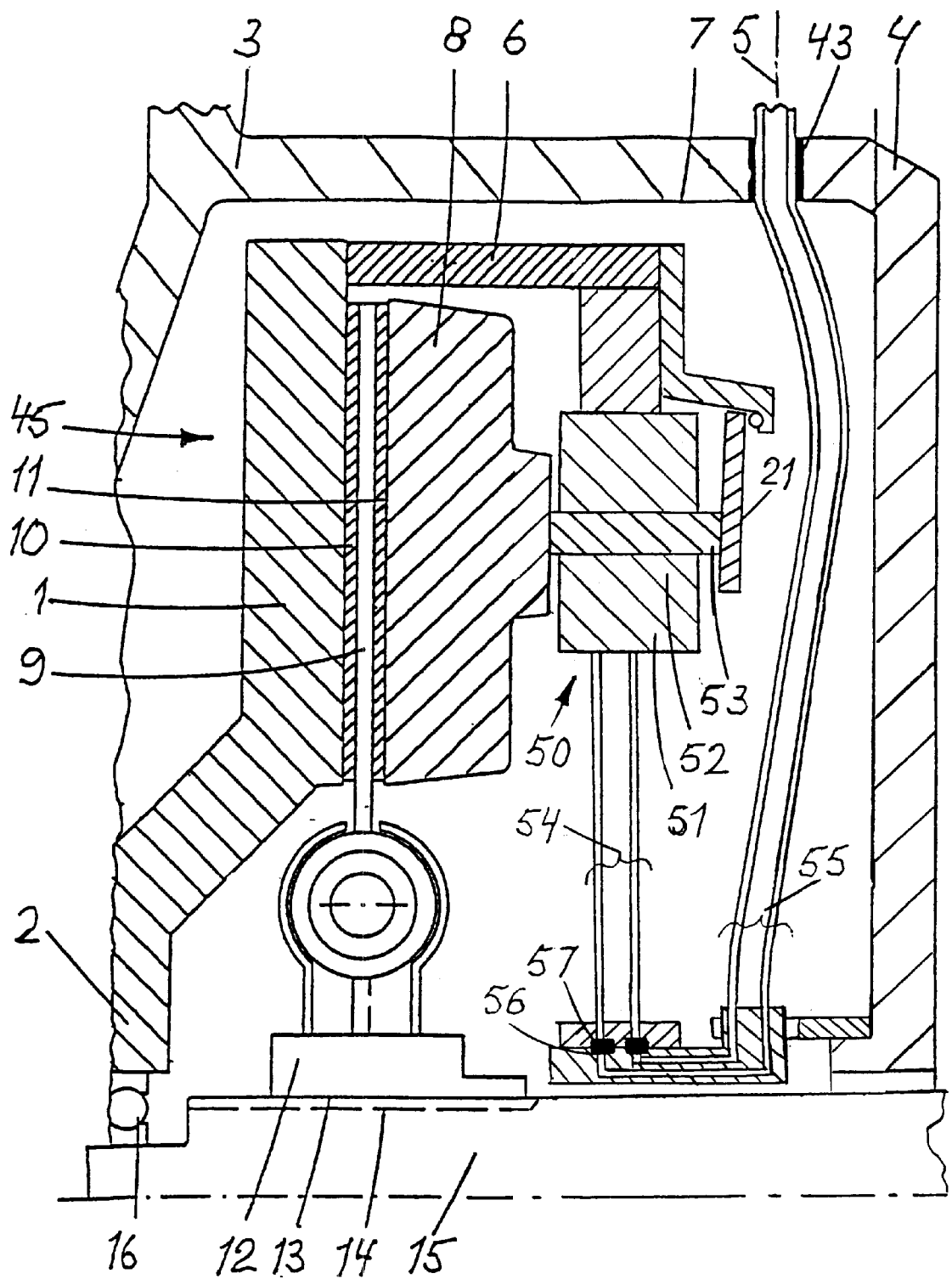

The invention will now be described in more detail with reference to the drawings, in which, FIG. 1 is a schematic longitudinal section through a clutch according to a first embodiment of the invention having a hydraulic actuator, only a portion on one side of a longitudinal axis of the clutch being shown; and FIG. 2 is a schematic longitudinal section through a second embodiment of the invention having an electrical jack actuator.

The directional indications "up" and "left" should be understood to refer to the directions towards the edge of the drawing facing away from the reader and the left edge respectively.

As shown in FIG. 1, a flywheel 1 which is connected to a drive shaft 2 of an engine (not shown), is provided in a first housing part 3 which is attached to the engine. The first housing part 3 may be releasably connected to a second housing part 4 by means of screws (not shown), the housing parts 3, 4 abutting against each other at a location 5.

A cylindrical intermediate piece 6, whose one end portion is securely connected to the flywheel 1, extends coaxially with and away from the flywheel. A second end portion of the intermediate piece 6 is securely connected to a clutch cover 7 which extends radially inwardly from the intermediate piece 6.

Between the flywheel 1 and the clutch cover 7 there is provided an annular pressure plate 8 which is fixed with regard to rotation, but provided axially movably relative to the intermediate piece 6, which may comprise lugs (not shown) in a known per se manner, extending radially inwardly and on which are mounted axially extending pins (not shown) which are passed into holes in the pressure plate 8, thus enabling it to slide on the pins.

Between the pressure plate 8 and the flywheel 1 there is provided a circular clutch disc 9 which has friction discs or linings 10, 11 on each side. At its radially inner edge the clutch disc 9 is connected to a boss or hub 12 with internal or splines grooves 13 which are engaged with external grooves or splines 14 of a driven shaft 15. The clutch disc 9 is thus fixed with regard to rotation, but axially movably connected to the driven shaft 15. The driven shaft 15 is rotatably mounted in the drive shaft 2 via a bearing 16.

A radially outer edge portion 20 of a cup spring 21 rests against the side of the clutch cover's radially inner edge 17 which faces the flywheel 1. The cup spring 21 has a radially inner edge portion 22.

Radially inwardly from the intermediate piece 6 there protrudes an actuator supporting portion 23 which may be approximately disc-shaped. At regular intervals along a circle which is coaxial relative to the shafts' longitudinal axis, in thickened portions of the actuator supporting portion 23 and between the cup spring and the pressure plate there are provided through-going, axial bores 24 with a first bore portion 25 and a second bore portion 25 with a diameter, which is smaller than the diameter of the first bore portion 27.

In each bore 24 there is provided a piston 27, a central portion 28 with a large diameter of the piston 27 being sealingly and slidably arranged in the first bore portion 25. Each of the thickened portions thus forms a housing or a cylinder for the piston 27. From the left side of the piston 27 a rod portion 29 protrudes sealingly through the second bore portion 26 towards the pressure plate 8. From the second side of the piston 27 a rod portion 30 protrudes towards the cup spring 21. In order to provide a seal between the piston's central portion 28 and the bore portion 25 and between the left rod portion 29 and the bore portion 26 suitable gaskets are provided.

The side of the piston 27 which faces the pressure plate and the opposite cylinder wall defines a cylinder space 31. When a pressure fluid is supplied to the cylinder space 31, the piston 27 can be moved to the right. Each bore 24 with piston 27 thereby forms a linear jack.

From each cylinder space 31 an inlet channel 32 extends radially inwardly in the actuator supporting portion 23. Near the driven shaft 15 the actuator supporting portion 23 is terminated by a cylindrical hub portion 34 where the inlet channel 32 has a radially inwardly open outlet 33. In each end portion of the hub portion 34 there is inserted a bearing 35, 36, into which there is inserted and mounted in turn a supply cylinder or casing 37. In the supply cylinder 37 there is provided a channel one of whose end portions is in the form of a radially outwardly open ring groove 38, which sealingly communicates with all the outlets 33 of the inlet channels 32, and whose second end portion is provided with a pipe connection 39. Near the pipe connection 39 there is attached to the second housing part 4 guide piece 40 which has an axially extending groove 41 whose sides support the pipe connection in the circumferential direction relative to the shafts' longitudinal axis.

From the pipe connection 39 a pipe or hose 42 extends radially outwardly through an opening 43 which is defined by facing U-shaped recesses in the housing parts 3, 4, at the location where they abut against each other. The hose can thereby be removed from the housing parts without being passed through a hole in one of them. The hose 42 is connected to a master cylinder which can be worked by an operator via a clutch pedal, whereby it should be understood that the cylinder, the jacks 24, 27, the inlet channels 32, the supply cylinder 37 and the hose 42 together form an actuator device 44 for operation of the clutch by means of a pressure fluid.

The flywheel 1, the intermediate piece 6, the clutch cover 7, the spring 21, the pressure plate 8 and the actuator device 44 form a first main part 45 of the clutch.

The clutch disc 9 and the boss 12 form a second main part of the clutch.

During rotation of the flywheel 2 the guide piece 40 ensures that the supply cylinder 37 remains stationary.

The clutch according to the invention works as follows.

When the clutch pedal is not being operated, the pressure of the hydraulic liquid in the cylinder 31, the inlet channel 32, the supply cylinder 37 and the hose 42 is low. In this case the force which is exerted by the cup spring 22 can be transferred to the pressure plate 8 via the piston 27, thus causing the clutch disc 9 to be forced against the flywheel 1. The clutch disc 9 is thereby securely held between the flywheel 2 and the pressure plate 8, thus permitting torque to be transferred from the drive shaft 2 to the driven shaft 15.

When the clutch pedal is operated, the pressure of the hydraulic liquid increases. A force is thereby exerted against the left side of each piston 27, which force attempts to move the piston 27 to the right. The right hand rod portion 30 then exerts a force against the radially inner edge portion 22 of the cup spring 21, moving it towards the right until the left hand rod portion 29 of the piston no longer abuts against the pressure plate 8. The clutch disc 9 is then no longer clamped and no torque is transferred from the drive shaft 2 to the driven shaft 15.

By means of the clutch according to the invention the pistons' stroke can be short since the spring force is transferred to the pressure plate 8 directly via the pistons. Thus the clutch may be short and require very little space.

When separating a gearbox from the clutch, the gearbox is released from the engine, whereupon the driven shaft 15 can be withdrawn from the bearing 16 and the boss 12. No components of the clutch need to be disconnected, including components of the actuator device 44, since it is connected to the first main part. This is a substantial simplification in comparison with the prior art. There is therefore no risk of components becoming wedged and thus complicating a dismantling operation.

If the second housing part 4 has to be removed from the first housing part 3, the second housing part 4 is first released from the first housing part 3 and then pulled to the right. The hose 42 hereby provides the necessary ability for the second housing part 4 to move relative to the first housing part 3, while at the same time the pipe connection 39 can be moved out of the groove 41 in the guide piece 40 The hose 42 may then be released from the pipe connection 39.

FIG. 2 shows a second embodiment of a clutch according to the invention in which the hydraulic actuator of the first embodiment is replaced by an electrical actuator 50 provided with a row of electrical jacks 51 instead of the hydraulic jacks 24, 27. The stator 52 of each electrical jack 51 then forms a housing for the jack's movable component 53. Instead of hydraulic lines and channels, electrical conductors or cables 54, 55 may then be provided, and instead of the hub portion 34, the bearings 35, 36 and the supply cylinder 37 which forms a fluid swivel, electrical slip rings 56 and brushes 57 may be provided.

It will further be understood that instead of the single cup spring 21, a number of cup springs may be provided which are stacked on top of one another, i.e. arranged in a row, thereby providing a greater spring movement. Thus new, thick friction facings of the clutch disc 9 can withstand a great amount of wear before the spring force declines significantly.

What is claimed is:

1. A clutch for use in a transmission line of a vehicle, comprising a first main part and a second main part extending coaxially in relation to each other and rotatable about a common longitudinal axis, the first and second main parts being non-rotationally connected to a drive shaft and a driven shaft respectively, the first main part having a first portion and a second portion spaced from each other at a distance in the axial direction, and a pressure plate and at least one pressure spring mounted between the first and second portions, the second main part having a clutch disc, the pressure plate and the clutch disc being axially movably connected to the drive shaft and the driven shaft, respectively, the pressure spring being mounted between the second portion and the pressure plate for bringing the pressure plate into frictional engagement against the clutch disc and simultaneously the clutch disc into frictional engagement against the first portion, an actuator device arranged for engagement with the pressure spring, thereby reducing the spring force exerted by the pressure spring against the pressure plate to reduce the frictional engagements, the actuator device being disposed in the first main part and having an axially movable body arranged between the pressure spring and the pressure plate so that the spring force is transferred to the pressure plate when the actuator device is not in operation, wherein the clutch further comprises a swivel arranged radially between the actuator device and the driven shaft and coaxially relative to the driven shaft, and a stationary clutch housing enclosing the main parts and the swivel, the swivel being adapted for transferring electric or pressure fluid energy for operation of the actuator device between an energy conductor that is stationary relative to the clutch housing and a rotary energy conductor connected to the actuator device, and wherein the clutch housing comprises a first housing part and a second housing part connectable by axial mutual movement of the housing parts only, and that the stationary conductor runs between the assembled housing parts.

2. A clutch according to claim 1, wherein the actuator device is a hydraulic actuator and the conductors are hydraulic lines.

3. A clutch according to claim 1, wherein the pressure spring is formed from at least one cup spring having circumferential edge portions arranged to abut against the second portion and the body, respectively.

4. A clutch for use in a transmission line of a vehicle, comprising a first main part and a second main part extending coaxially in relation to each other and rotatable about a common longitudinal axis, the first and second main parts being non-rotationally connected to a drive shaft and a driven shaft respectively, the first main part having a first portion and a second portion spaced from each other at a distance in the axial direction, and a pressure plate and at least one pressure spring mounted between the first and second portions, the second main part having a clutch disc, the pressure plate and the clutch disc being axially movably connected to the drive shaft and the driven shaft, respectively, the pressure spring being mounted between the second portion and the pressure plate for bringing the pressure plate into frictional engagement against the clutch disc and simultaneously the clutch disc into frictional engagement against the first portion, an actuator device arranged for engagement with the pressure spring, thereby reducing the spring force exerted by the pressure spring against the pressure plate to reduce the frictional engagements, the actuator device being disposed in the first main part and having an axially movable body arranged between the pressure spring and the pressure plate so that the spring force is transferred to the pressure plate when the actuator device is not in operation, wherein the clutch further comprises a swivel arranged radially between the actuator device and the driven shaft and coaxially relative to the driven shaft, and a stationary clutch housing enclosing the main parts and the swivel, the swivel being adapted for transferring electric or pressure fluid energy for operation of the actuator device between an energy conductor that is stationary relative to the clutch housing and a rotary energy conductor connected to the actuator device, wherein the actuator device is an electrical jack and the conductors are electrical conductors.

5. A clutch for use in a transmission line of a vehicle, comprising a first main part and a second main part extending coaxially in relation to each other and rotatable about a common longitudinal axis, the first and second main parts being non-rotationally connected to a drive shaft and a driven shaft respectively, the first main part having a first portion and a second portion spaced from each other at a distance in the axial direction, and a pressure plate and at least one pressure spring mounted between the first and second portions, the second main part having a clutch disc, the pressure plate and the clutch disc being axially movably connected to the drive shaft and the driven shaft, respectively, the pressure spring being mounted between the second portion and the pressure plate for bringing the pressure plate into frictional engagement against the clutch disc and simultaneously the clutch disc into frictional engagement against the first portion, an actuator device arranged for engagement with the pressure spring, thereby reducing the spring force exerted by the pressure spring against the pressure plate to reduce the frictional engagements, the actuator device being disposed in the first main part and having an axially movable body arranged between the pressure spring and the pressure plate so that the spring force is transferred to the pressure plate when the actuator device is not in operation, wherein the clutch further comprises a swivel arranged radially between the actuator device and the driven shaft and coaxially relative to the driven shaft, and a stationary clutch housing enclosing the main parts and the swivel, the swivel being adapted for transferring electric or pressure fluid energy for operation of the actuator device between an energy conductor that is stationary relative to the clutch housing and a rotary energy conductor connected to the actuator device, wherein the actuator device is a hydraulic actuator and the conductors are hydraulic lines and wherein the stationary conductor is flexible.

* * * * *